US008457958B2

(12) United States Patent
Koishida et al.

(10) Patent No.: US 8,457,958 B2
(45) Date of Patent: Jun. 4, 2013

(54) AUDIO TRANSCODER USING ENCODER-GENERATED SIDE INFORMATION TO TRANSCODE TO TARGET BIT-RATE

(75) Inventors: Kazuhito Koishida, Redmond, WA (US); Sanjeev Mehrotra, Kirkland, WA (US); Wei-Ge Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 11/938,194

(22) Filed: Nov. 9, 2007

(65) Prior Publication Data

US 2009/0125315 A1 May 14, 2009

(51) Int. Cl.
*G10L 19/02* (2006.01)
*H04B 1/66* (2006.01)

(52) U.S. Cl.
USPC ............................ 704/230; 704/229; 704/500

(58) Field of Classification Search
USPC .............. 704/200.1, 203, 205, 206, 229, 230, 704/500, 501
See application file for complete search history.

(56) References Cited

U.S. PATENT DOCUMENTS 4,142,071 A 2/1979 Croisier et al.
4,216,354 A 8/1980 Esteban et al.
4,464,783 A 8/1984 Beraud et al.
5,243,420 A 9/1993 Hibi
5,341,457 A * 8/1994 Hall et al. ..................... 704/226
5,381,143 A 1/1995 Shimoyoshi et al.
5,454,011 A 9/1995 Shimoyoshi
5,461,378 A * 10/1995 Shimoyoshi et al. ........... 341/51
5,463,424 A 10/1995 Dressler
5,537,440 A 7/1996 Eyuboglu et al.
5,541,852 A 7/1996 Eyuboglu et al.
5,544,266 A 8/1996 Koppelmans et al.
5,617,142 A 4/1997 Hamilton
5,623,424 A 4/1997 Azadegan et al.
5,659,660 A 8/1997 Plenge et al.
5,835,495 A 11/1998 Ferriere (Continued)

FOREIGN PATENT DOCUMENTS

JP 2002-152752 5/2002
JP 2005-252555 9/2005
KR 10-2005-0089720 9/2005
WO WO 01/95633 12/2001

OTHER PUBLICATIONS

WIPO Bibliographic Document, WO/2007/131886, Publication Date: Nov. 22, 2007, Two Pages.*

(Continued)

*Primary Examiner* — Martin Lerner
(74) *Attorney, Agent, or Firm* — Klarquist Sparkman, LLP

(57) ABSTRACT

An audio encoder encodes side information into a compressed audio bitstream containing encoding parameters used by the encoder for one or more encoding techniques, such as a noise-mask-ratio curve used for rate control. A transcoder uses the encoder generated side information to transcode the audio from the original compressed bitstream having an initial bit-rate into a second bitstream having a new bit-rate. Because the side information is derived from the original audio, the transcoder is able to better maintain audio quality of the transcoding. The side information also allows the transcoder to re-encode from an intermediate decoding/encoding stage for faster and lower complexity transcoding.

23 Claims, 7 Drawing Sheets

U.S. PATENT DOCUMENTS

| | | | | |
|---|---|---|---|---|
| 5,970,173 | A | 10/1999 | Lee et al. | |
| 6,044,089 | A | 3/2000 | Ferriere | |
| 6,084,909 | A | 7/2000 | Chiang et al. | |
| 6,259,741 | B1 | 7/2001 | Chen et al. | |
| 6,370,502 | B1 | 4/2002 | Wu et al. | |
| 6,393,059 | B1 | 5/2002 | Sugiyama | |
| 6,404,814 | B1 | 6/2002 | Apostolopoulos et al. | |
| 6,426,977 | B1 | 7/2002 | Lee et al. | |
| 6,434,197 | B1 | 8/2002 | Wang et al. | |
| 6,463,414 | B1 | 10/2002 | Su et al. | |
| 6,466,623 | B1 | 10/2002 | Youn et al. | |
| 6,496,216 | B2 | 12/2002 | Feder | |
| 6,496,868 | B2 | 12/2002 | Krueger et al. | |
| 6,522,693 | B1 | 2/2003 | Lu et al. | |
| 6,526,099 | B1 | 2/2003 | Christopoulos et al. | |
| 6,606,600 | B1 * | 8/2003 | Murgia et al. | 704/500 |
| 6,647,061 | B1 | 11/2003 | Panusopone et al. | |
| 6,650,705 | B1 | 11/2003 | Vetro et al. | |
| 6,678,654 | B2 | 1/2004 | Zinser, Jr. et al. | |
| 6,728,317 | B1 | 4/2004 | Demos | |
| 6,757,648 | B2 | 6/2004 | Chen et al. | |
| 6,925,501 | B2 | 8/2005 | Wang et al. | |
| 6,931,064 | B2 | 8/2005 | Mori et al. | |
| 6,934,334 | B2 | 8/2005 | Yamaguchi et al. | |
| 6,944,224 | B2 | 9/2005 | Zhao | |
| 6,961,377 | B2 | 11/2005 | Kingsley | |
| 7,009,935 | B2 * | 3/2006 | Abrahamsson et al. | 370/228 |
| 7,027,982 | B2 | 4/2006 | Chen et al. | |
| 7,039,116 | B1 | 5/2006 | Zhang et al. | |
| 7,058,127 | B2 | 6/2006 | Lu et al. | |
| 7,142,601 | B2 | 11/2006 | Kong et al. | |
| 7,295,612 | B2 | 11/2007 | Haskell | |
| 7,318,027 | B2 | 1/2008 | Lennon et al. | |
| 7,408,918 | B1 * | 8/2008 | Ramalho | 370/351 |
| 7,953,604 | B2 * | 5/2011 | Mehrotra et al. | 704/500 |
| 2002/0080877 | A1 | 6/2002 | Lu et al. | |
| 2002/0172154 | A1 | 11/2002 | Uchida et al. | |
| 2003/0206597 | A1 | 11/2003 | Kolarov et al. | |
| 2003/0227974 | A1 | 12/2003 | Nakamura et al. | |
| 2004/0136457 | A1 | 7/2004 | Funnell et al. | |
| 2004/0165667 | A1 | 8/2004 | Lennon et al. | |
| 2005/0041740 | A1 | 2/2005 | Sekiguchi | |
| 2005/0075869 | A1 | 4/2005 | Gersho et al. | |
| 2005/0165611 | A1 | 7/2005 | Mehrotra et al. | |
| 2005/0232497 | A1 | 10/2005 | Yogeshwar et al. | |
| 2006/0069550 | A1 * | 3/2006 | Todd et al. | 704/212 |
| 2006/0120610 | A1 | 6/2006 | Kong et al. | |
| 2006/0245491 | A1 | 11/2006 | Jam et al. | |
| 2007/0053444 | A1 | 3/2007 | Shibata et al. | |
| 2007/0058718 | A1 | 3/2007 | Shen et al. | |
| 2007/0058729 | A1 | 3/2007 | Yoshinari | |
| 2007/0219787 | A1 * | 9/2007 | Manjunath et al. | 704/207 |
| 2008/0021704 | A1 * | 1/2008 | Thumpudi et al. | 704/230 |
| 2008/0071528 | A1 * | 3/2008 | Ubale et al. | 704/220 |
| 2008/0144723 | A1 | 6/2008 | Chen et al. | |
| 2008/0187046 | A1 | 8/2008 | Joch | |
| 2008/0221908 | A1 * | 9/2008 | Thumpudi et al. | 704/500 |
| 2008/0234846 | A1 * | 9/2008 | Malvar | 700/94 |
| 2008/0259921 | A1 | 10/2008 | Nadarajah | |
| 2008/0260048 | A1 * | 10/2008 | Oomen et al. | 375/241 |
| 2009/0106031 | A1 * | 4/2009 | Jax et al. | 704/500 |
| 2012/0035941 | A1 * | 2/2012 | Thumpudi et al. | 704/500 |

OTHER PUBLICATIONS

WIPO Bibliographic Document, WO/2005/078707, Publication Date: Aug. 25, 2005, Two Pages.*

Khan et al., "Architecture Overview of Motion Vector Reuse Mechanism in MPEG-2 Transcoding," Technical Report TR2001-01-01, Jan. 2001, 7 pp.

Moshnyaga, "An Implementation of Data Reusable MPEG Video Coding Scheme," *Proceedings of World Academy of Science, Engineering and Technology*, vol. 2, pp. 193-196, Jan. 2005.

Moshnyaga, "Reduction of Memory Accesses in Motion Estimation by Block-Data Reuse," *ICASSP '02 Proceedings, IEEE International Conference on Acoustics, Speech, and Signal Processing*, vol. 3, pp. III-3128-III-3131, May 2002.

Nasim et al., "*Architectural Optimizations for Software-Bassed MPEG4 Video Encoder*," 13th European Signal Processing Conference: EUSIPCO'2005, 4 pp., Sep. 2005.

Senda et al., "*A Realtime Software MPEG Transcoder Using a Novel Motion Vector Reuse and SIMD Optimization Techniques*," ICASSP '99 Proceedings, 1999 IEEE International Conference on Acoustics, Speech and Signal Processing, vol. 4, pp. 2359-2362, Mar. 1999.

Zhou et al., "*Motion Vector Reuse Algorithm to Improve Dual-Stream Video Encoder*," ICSP 2008, 9th International Conference on Signal Processing, pp. 1283-1286, Oct. 2008.

Kamikura K., Watanabe H., Jozawa H., Kotera H., and Ichinose S. "Global brightness-variation compensation for video coding". _ IEEE Trans. on Circuits and Systems for Video Technology—vol. 8, No. 8, (Dec. 1998):988-1000.

Takahashi K., Satou K., Suzuki T., and Yagasaki Y. "Motion Vector Synthesis Algorithm for MPEG2-to-MPEG4 Transcoder" -Proc. of SPIE_ vol. 4310 (Jan. 2001): 872-882.

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

U.S. Appl. No. 60/501,133, filed Sep. 7, 2003, Holcomb et al.

Acharya et al., "Compressed Domain Transcoding of MPEG," *Proc. IEEE Int'l Conf. on Multimedia Computing and Systems*, Austin, Texas, 20 pp. (Jun. 1998).

Amir et al., "An Application Level Video Gateway," *Proc. ACM Multimedia 95*, 10 pp. (Nov. 1995).

Assuncao et al., "A Frequency-Domain Video Transcoder for Dynamic Bit-Rate Reduction of MPEG-2 Bit Streams," *IEEE Transactions on Circuits and Systems for Video Technology*, vol. 8, No. 8, pp. 953-967 (Dec. 1998).

Assuncao et al., "Buffer Analysis and Control in CBR Video Transcoding," *IEEE Transactions on Circuits and Systems for Video Technology*, vol. 10, No. 1, pp. 83-92 (Feb. 2000).

Assuncao et al., "Transcoding of Single-Layer MPEG Video Into Lower Rates," *IEE Proc.—Vis. Image Signal Process.*, vol. 144, No. 6, pp. 377-383 (Dec. 1997).

Braun et al., "Motion-Compensating Real-Time Format Converter for Video on Multimedia Displays," *Proceedings IEEE 4th International Conference on Image Processing* (*ICIP-97*), vol. I, pp. 125-128 (1997).

Brightwell et al., "Flexible Switching and Editing of MPEG-2 Video Bitstreams," *IBC-97*, Amsterdam, 11 pp. (1997).

Crooks, "Analysis of MPEG Encoding Techniques on Picture Quality," *Tektronix Application Note*, 11 pp. (Jun. 1998).

Dipert, "Image Compression Article Addendum," *EDN Magazine*, 8 pp. (Jun. 18, 1998).

Fogg, "Question That Should Be Frequently Asked About MPEG," Version 3.8, 46 pp. (1996).

Gibson et al., *Digital Compression for Multimedia*, "Chapter 4: Quantization," Morgan Kaufman Publishers, Inc., pp. 113-138 (1998).

Gibson et al., *Digital Compression for Multimedia*, "Chapter 7: Frequency Domain Coding," Morgan Kaufman Publishers, Inc., pp. 227-262 (1998).

Hamming, *Digital Filters*, Second Edition, "Chapter 2: The Frequency Approach," Prentice-Hall, Inc., pp. 19-31 (1977).

Haskell et al., *Digital Video: An Introduction to MPEG-2*, Table of Contents, International Thomson Publishing, 6 pp. (1997).

ISO/IEC, "ISO/IEC 11172-2, Information Technology—Coding of Moving Pictures and Associated Audio for Digital Storage Media at up to about 1.5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at *p* x 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video Coding for Low Bit Rate Communication," 162 pp. (1998).

Joint Video Team (JVT) of ISO/IEC MPEG & ITU-T VCEG, “Joint Final Committee Draft (JFCD) of Joint Video Specification,” JVT-D157, 207 pp. (Aug. 2002).
Keesman et al., “Transcoding of MPEG Bitstreams,” *Signal Processing: Image Communication 8*, pp. 481-500 (1996).
Knee et al., “Seamless Concatenation—A 21st Century Dream,” 13 pp. (1997).
Lei et al., “Rate Adaptation Transcoding for Precoded Video Streams,” 13 pp. (2000).
Leventer et al., “Towards Optimal Bit-Rate Control in Video Transcoding,” *ICIP*, xx pp. (2003).
Microsoft Corporation, “Microsoft Debuts New Windows Media Player 9 Series, Redefining Digital Media on the PC,” 4 pp. (Sep. 4, 2002) [Downloaded from the World Wide Web on May 14, 2004].
Mook, “Next-Gen Windows Media Player Leaks to the Web,” *BetaNews*, 17 pp. (Jul. 2002) [Downloaded from the World Wide Web on Aug. 8, 2003].
Printouts of FTP directories from http://ftp3.itu.ch, 8 pp. [Downloaded from the World Wide Web on Sep. 20, 2005].
Reader, “History of MPEG Video Compression—Ver. 4.0,” 99 pp. [Document marked Dec. 16, 2003].
Shanableh et al., “Heterogeneous Video Transcoding to Lower Spatio-Temporal Resolutions and Different Encoding Formats,” *IEEE Transactions on Multimedia*, 31 pp. (Jun. 2000).
Shanableh et al., “Transcoding of Video Into Different Encoding Formats,” *ICASSP—2000 Proceedings*, vol. IV of VI, pp. 1927-1930 (Jun. 2000).
SMPTE, “SMPTE 327M-2000—MPEG-2 Video Recoding Data Set,” 9 pp. (Jan. 2000).
Sun et al., “Architectures for MPEG Compressed Bitstream Scaling,” *IEEE Transactions on Circuits and Systems for Video Technology*, vol. 6, No. 2, pp. 191-199 (Apr. 1996).
Sun et al., “Lossless Coders,” *Digital Signal Processing for Multimedia Systems*, Chapter 15, pp. 385-416 (1999). (Sun et al.?).
Swann et al., “Transcoding of MPEG-II for Enhanced Resilience to Transmission Errors,” *Cambridge University Engineering Department*, Cambridge, UK, pp. 1-4. 1996.
Tan et al., “On the Methods and Performances of Rational Downsizing Video Transcoding,” *Signal Processing: Image Communication 19*, pp. 47-65 (2004).
Tektronix Application Note, “Measuring and Interpreting Picture Quality in MPEG Compressed Video Content,” 8 pp. (2001).
Tudor et al., “Real-Time Transcoding of MPEG-2 Video Bit Streams,” *BBC R&D*, U.K., 6 pp. (1997).
Vishwanath et al., “A VLSI Architecture for Real-Time Hierarchical Encoding/Decoding of Video Using the Wavelet Transform,” *Proc. ICASSP*, 5 pp. (1994).
Watkinson, *The MPEG Handbook*, pp. 275-281 (2004).
Werner, “Generic Quantiser for Transcoding of Hybrid Video,” *Proc. 1997 Picture Coding Symposium*, Berlin, Germany, 6 pp. (Sep. 1997).
Werner, “Requantization for Transcoding of MPEG-2 Intraframes,” *IEEE Transactions on Image Processing*, vol. 8, No. 2, pp. 179-191 (Feb. 1999).
Wiegand et al., “Overview of the H.264/AVC Coding Standard,” *IEEE Trans. on Circuits and Systems for Video Technology*, vol. 13, No. 7, pp. 560-576 (Jul. 2003).
Youn et al., “Video Transcoder Architectures for Bit Rate Scaling of H.263 Bit Streams,” *ACM Multimedia 1999*, Orlando, Florida, pp. 243-250 (1999).
H.264—a New Technology for Video Compression, Nuntius Systems, Mar. 6, 2004, <http://www.nuntius.com/technology3.html>, 4 pages.
ISO/IEC MPEG-2 Test Model 5 (with Overview), Mar. 1993, 10 pages.
Kari, J.; Gavrilescu, M., “Intensity controlled motion compensation,” Data Compression Conference, 1998, DCC ’98. Porceedings, vol., No., pp. 249-258, Mar. 30-Apr. 1, 1998.
Roy et al., “Application Level Hand-off Support for Mobile Media Transcoding Sessions,” *Proceedings of the 12th International Workshop on Network and Operating Systems Support for Digital Audio and Video*, 2002, 22 pages.
Vetro et al., “Complexity-Quality Analysis of Transcoding Architectures for Reduced Spatial Resolution,” *IEEE Transactions on Consumer Electronics*, 2002, 9 pages.

* cited by examiner

AUDIO TRANSCODER USING ENCODER-GENERATED SIDE INFORMATION TO TRANSCODE TO TARGET BIT-RATE

BACKGROUND

Perceptual Transform Coding

With the introduction of portable digital media players, the compact disk for music storage and audio delivery over the Internet, it is now common to store, buy and distribute music and other audio content in digital audio formats. The digital audio formats empower people to enjoy having hundreds or thousands of music songs available on their personal computers (PCs) or portable media players.

One benefit of digital audio formats is that a proper bit-rate (compression ratio) can be selected according to given constraints, e.g., file size and audio quality. On the other hand, one particular bit-rate is not able to cover all scenarios of audio applications. For instance, higher bit-rates may not be suitable for portable devices due to limited storage capacity. By contrast, higher bit-rates are better suited for high quality sound reproduction desired by audiophiles.

When audio content is not at a suitable bit-rate for the application scenario (e.g., when high bit-rate audio is desired to be loaded onto a portable device or transferred via the Internet), a way to change the bit-rate of the audio file is needed. One known solution for this is to use a transcoder, which takes one compressed audio bitstream that is coded at one bit-rate as its input and re-encodes the audio content to a new bit-rate.

FIG. 1 illustrates a simple and widely-used approach to transcoding called "decode-and-encode" (DAE) transcoding. In this approach, a full decoding of a compressed bitstream (B) 105 having an original coding bit-rate is performed by a decoder 110. This produces a reconstruction of the original audio signal content as decoded audio samples 115. The decoded audio samples are then fully re-encoded by an encoder 120 to produce a compressed bitstream (B') 135 with a target bit-rate. However, this approach often leads to high computational complexity due to performing the full encoding. In addition, the approach results in degraded audio quality compared to a one-time encoding at the same target bit-rate from the original audio source since the transcoder does not have the original audio source available.

SUMMARY

The following Detailed Description concerns various transcoding techniques and tools that provide a way to modify the bit-rate of a compressed digital audio bitstream.

More particularly, the novel transcoding approach presented herein encodes additional side information in a compressed bitstream to preserve information used in certain stages of encoding. A transcoder uses this side information to avoid or skip certain encoding stages when transcoding the compressed bitstream to a different (e.g., lower) bit-rate. In particular, by encoding certain side information into an initially encoded compressed bitstream, the transcoder can skip certain computationally intensive encoding processes, such as a time-frequency transform, pre-processing and quality based bit-rate control. Using preserved side-information coded into the initial version compressed bitstream, the transcoder avoids having to fully decode the initial compressed bitstream into a reconstructed time-sampled audio signal, and avoids a full re-encoding of such reconstructed audio signal to the new target bit-rate. With certain processing stages omitted, the transcoder instead can merely partially decode the initial compressed bitstream, and partially re-encode to the new target bit-rate. In addition, the side-information can contain information which can only be derived from the original signal which can result in a better quality transcoding.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

Various techniques and tools for fast and high quality transcoding of digital audio content are described. These techniques and tools facilitate the transcoding of an audio content bitstream encoded at an initial bit-rate into a target bit-rate suitable to another application or usage scenario for further storage, transmission and distribution of the audio content.

The various techniques and tools described herein may be used independently. Some of the techniques and tools may be used in combination (e.g., in different phases of a transcoding process).

Various techniques are described below with reference to flowcharts of processing acts. The various processing acts shown in the flowcharts may be consolidated into fewer acts or separated into more acts. For the sake of simplicity, the relation of acts shown in a particular flowchart to acts described elsewhere is often not shown. In many cases, the acts in a flowchart can be reordered.

Much of the detailed description addresses representing, coding, decoding and transcoding audio information. Many of the techniques and tools described herein for representing, coding, decoding and transcoding audio information can also be applied to video information, still image information, or other media information sent in single or multiple channels.

I. Example Audio Encoders and Decoders

Figure 2:
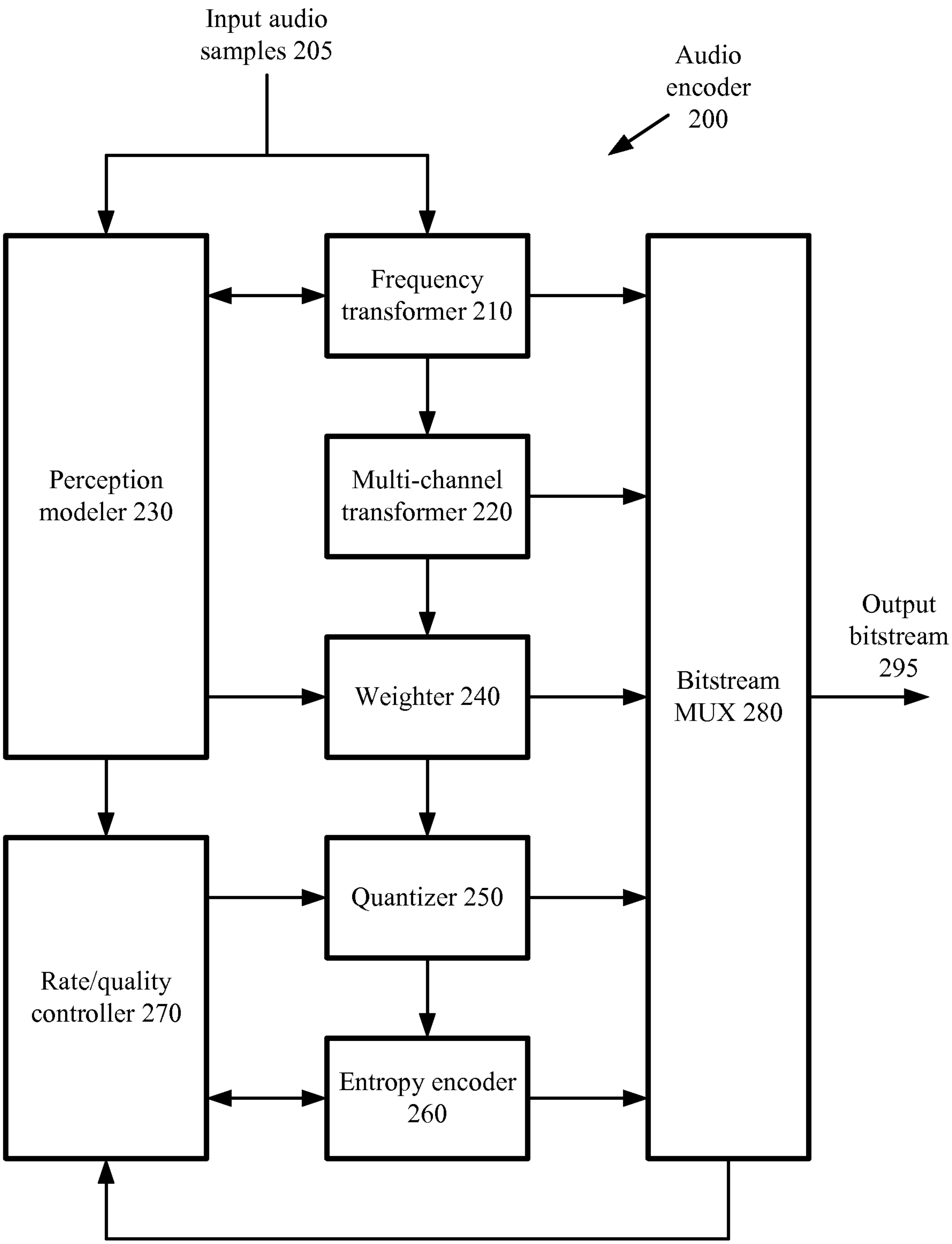
FIGS. 2 and 3 are block diagrams of a generalized implementation of audio encoders and/or decoders in conjunction with which various described embodiments may be implemented.
Figure 3:
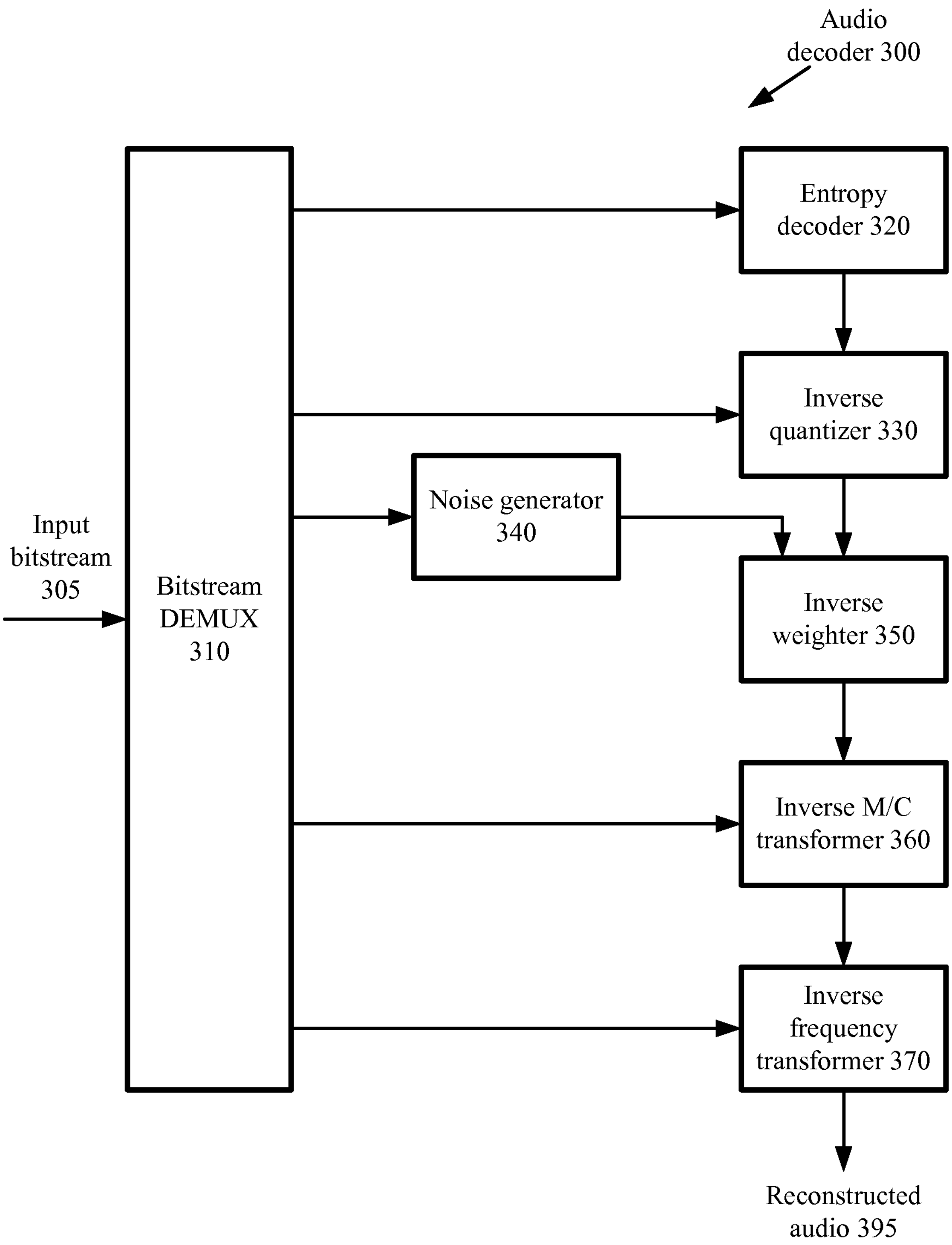

FIG. 2 shows a first audio encoder 200 in which one or more described embodiments may be implemented. The encoder 200 is a transform-based, perceptual audio encoder 200. FIG. 3 shows a corresponding audio decoder 300.

Though the systems shown in FIGS. 2 through 3 are generalized, each has characteristics found in real world systems.

In any case, the relationships shown between modules within the encoders and decoders indicate flows of information in the encoders and decoders; other relationships are not shown for the sake of simplicity. Depending on implementation and the type of compression desired, modules of an encoder or decoder can be added, omitted, split into multiple modules, combined with other modules, and/or replaced with like modules. In alternative embodiments, encoders or decoders with different modules and/or other configurations process audio data or some other type of data according to one or more described embodiments.

A. Audio Encoder

The encoder 200 receives a time series of input audio samples 205 at some sampling depth and rate. The input audio samples 205 are for multi-channel audio (e.g., stereo) or mono audio. The encoder 200 compresses the audio samples 205 and multiplexes information produced by the various modules of the encoder 200 to output a bitstream 295 in a compression format such as a WMA format, a container format such as Advanced Streaming Format ("ASF"), or other compression or container format.

The frequency transformer 210 receives the audio samples 205 and converts them into data in the frequency (or spectral) domain. For example, the frequency transformer 210 splits the audio samples 205 of frames into sub-frame blocks, which can have variable size to allow variable temporal resolution. Blocks can overlap to reduce perceptible discontinuities between blocks that could otherwise be introduced by later quantization. The frequency transformer 210 applies to blocks a time-varying Modulated Lapped Transform ("MLT"), modulated DCT ("MDCT"), some other variety of MLT or DCT, or some other type of modulated or non-modulated, overlapped or non-overlapped frequency transform, or uses sub-band or wavelet coding. The frequency transformer 210 outputs blocks of spectral coefficient data and outputs side information such as block sizes to the multiplexer ("MUX") 280.

For multi-channel audio data, the multi-channel transformer 220 can convert the multiple original, independently coded channels into jointly coded channels. Or, the multi-channel transformer 220 can pass the left and right channels through as independently coded channels. The multi-channel transformer 220 produces side information to the MUX 280 indicating the channel mode used. The encoder 200 can apply multi-channel rematrixing to a block of audio data after a multi-channel transform.

The perception modeler 230 models properties of the human auditory system to improve the perceived quality of the reconstructed audio signal for a given bitrate. The perception modeler 230 uses any of various auditory models and passes excitation pattern information or other information to the weighter 240. For example, an auditory model typically considers the range of human hearing and critical bands (e.g., Bark bands). Aside from range and critical bands, interactions between audio signals can dramatically affect perception. In addition, an auditory model can consider a variety of other factors relating to physical or neural aspects of human perception of sound.

The perception modeler 230 outputs information that the weighter 240 uses to shape noise in the audio data to reduce the audibility of the noise. For example, using any of various techniques, the weighter 240 generates weighting factors for quantization matrices (sometimes called masks) based upon the received information. The weighting factors for a quantization matrix include a weight for each of multiple quantization bands in the matrix, where the quantization bands are frequency ranges of frequency coefficients. Thus, the weighting factors indicate proportions at which noise/quantization error is spread across the quantization bands, thereby controlling spectral/temporal distribution of the noise/quantization error, with the goal of minimizing the audibility of the noise by putting more noise in bands where it is less audible, and vice versa.

The weighter 240 then applies the weighting factors to the data received from the multi-channel transformer 220.

The quantizer 250 quantizes the output of the weighter 240, producing quantized coefficient data to the entropy encoder 260 and side information including quantization step size to the MUX 280. In FIG. 2, the quantizer 250 is an adaptive, uniform, scalar quantizer. The quantizer 250 applies the same quantization step size to each spectral coefficient, but the quantization step size itself can change from one iteration of a quantization loop to the next to affect the bitrate of the entropy encoder 260 output. Other kinds of quantization are non-uniform, vector quantization, and/or non-adaptive quantization.

The entropy encoder 260 losslessly compresses quantized coefficient data received from the quantizer 250, for example, performing run-level coding and vector variable length coding. The entropy encoder 260 can compute the number of bits spent encoding audio information and pass this information to the rate/quality controller 270.

The controller 270 works with the quantizer 250 to regulate the bitrate and/or quality of the output of the encoder 200. The controller 270 outputs the quantization step size to the quantizer 250 with the goal of satisfying bitrate and quality constraints.

In addition, the encoder 200 can apply noise substitution and/or band truncation to a block of audio data.

The MUX 280 multiplexes the side information received from the other modules of the audio encoder 200 along with the entropy encoded data received from the entropy encoder 260. The MUX 280 can include a virtual buffer that stores the bitstream 295 to be output by the encoder 200.

B. Audio Decoder

The decoder 300 receives a bitstream 305 of compressed audio information including entropy encoded data as well as side information, from which the decoder 300 reconstructs audio samples 395.

The demultiplexer ("DEMUX") 310 parses information in the bitstream 305 and sends information to the modules of the decoder 300. The DEMUX 310 includes one or more buffers to compensate for short-term variations in bitrate due to fluctuations in complexity of the audio, network jitter, and/or other factors.

The entropy decoder 320 losslessly decompresses entropy codes received from the DEMUX 310, producing quantized spectral coefficient data. The entropy decoder 320 typically applies the inverse of the entropy encoding techniques used in the encoder.

The inverse quantizer 330 receives a quantization step size from the DEMUX 310 and receives quantized spectral coefficient data from the entropy decoder 320. The inverse quantizer 330 applies the quantization step size to the quantized frequency coefficient data to partially reconstruct the frequency coefficient data, or otherwise performs inverse quantization.

From the DEMUX 310, the noise generator 340 receives information indicating which bands in a block of data are noise substituted as well as any parameters for the form of the noise. The noise generator 340 generates the patterns for the indicated bands, and passes the information to the inverse weighter 350.

The inverse weighter 350 receives the weighting factors from the DEMUX 310, patterns for any noise-substituted bands from the noise generator 340, and the partially reconstructed frequency coefficient data from the inverse quantizer 330. As necessary, the inverse weighter 350 decompresses weighting factors. The inverse weighter 350 applies the weighting factors to the partially reconstructed frequency coefficient data for bands that have not been noise substituted. The inverse weighter 350 then adds in the noise patterns received from the noise generator 340 for the noise-substituted bands.

The inverse multi-channel transformer 360 receives the reconstructed spectral coefficient data from the inverse weighter 350 and channel mode information from the DEMUX 310. If multi-channel audio is in independently coded channels, the inverse multi-channel transformer 360 passes the channels through. If multi-channel data is in jointly coded channels, the inverse multi-channel transformer 360 converts the data into independently coded channels.

The inverse frequency transformer 370 receives the spectral coefficient data output by the multi-channel transformer 360 as well as side information such as block sizes from the DEMUX 310. The inverse frequency transformer 370 applies the inverse of the frequency transform used in the encoder and outputs blocks of reconstructed audio samples 395.

II. Transcoding Using Encoder Generated Side Information

Figure 4:
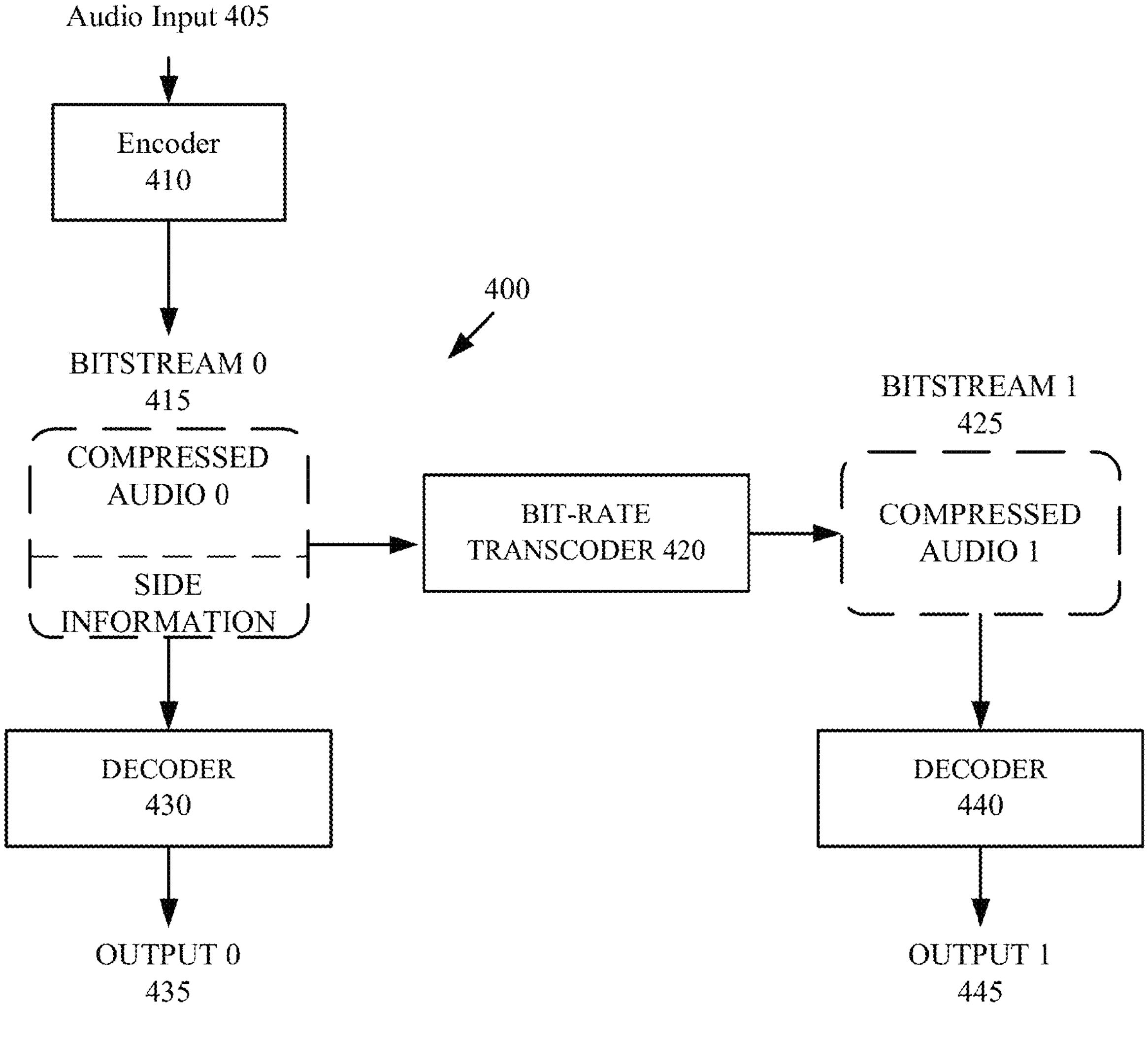
FIG. 4 is a block diagram of a bit-rate transcoder, which utilizes encoder-generated side-information.

FIG. 4 illustrates a general use scenario 400 for a bit-rate transcoder 420 that performs transcoding using encoder generated side information as described herein. In this use scenario, an encoder 410 (which may be implemented as the encoder 200 described above) encodes an audio input 405 into a bitstream ("Bitstream 0") 415 having a bit-rate suitable to a first application (e.g., high audio quality). This bitstream 415 may be distributed to another location, later time or setting where the original audio input is no longer available for encoding to another desired bit-rate suitable to another application (e.g., small file size for a portable device, or Internet distribution with lower bandwidth).

The encoder also encodes side information in the bitstream 415 for use in transcoding the bitstream by the bit-rate transcoder 420. This side information for transcoding generally includes information such as encoding parameters that are generated during the encoding process and typically discarded by an encoder when encoding for single bit-rate applications. These encoding parameters are derived from the original source audio input, which again is otherwise unavailable at the other location, time or setting to the bit-rate transcoder 420.

The encoder 410 can quantize the side information, so as to reduce the increase in bit-rate that the side information otherwise adds to the compressed bitstream 415. At very low bit-rates, the side information is quantized down to 1 kbps, which is generally a negligible bit-rate increase in many applications. In some embodiments of the bit-rate transcoder, this small of a bit-rate increase can permit the encoder to code multiple versions of the side information to support transcoding to different bitstream formats.

The bit-rate transcoder 420 receives the bitstream 415 that is encoded at the initial bit-rate and transcodes the bitstream using the side information to produce another transcoded bitstream ("Bitstream 1") 425 having a second bit-rate suitable to the other application. Due to audio information loss when encoding the first bit-stream to the initial bit-rate, the transcoding process cannot add audio information and therefore would generally transcode to a lower bit-rate. The bit-rate transcoder 420 also may pass the side information into the bitstream 425. However, because audio information would be lost with each transcoding to lower bit-rates, it generally would not be desirable to cascade transcoding the audio content to successively lower bit-rates. The bit-rate transcoder 420 therefore generally omits encoding the side information into the transcoded bitstream 425.

Each of the bitstreams 415 and 425 can then be stored, transmitted or otherwise distributed in their respective application scenarios to be decoded by decoders 430, 440. The decoders 430, 440 can be identical decoders (e.g., such as the decoder 300 described above), each capable of handling multiple bit-rates of encoded bitstreams. The decoders 430, 440 reconstruct the audio content as their output 435, 445 in their respective application scenarios.

Figure 5:
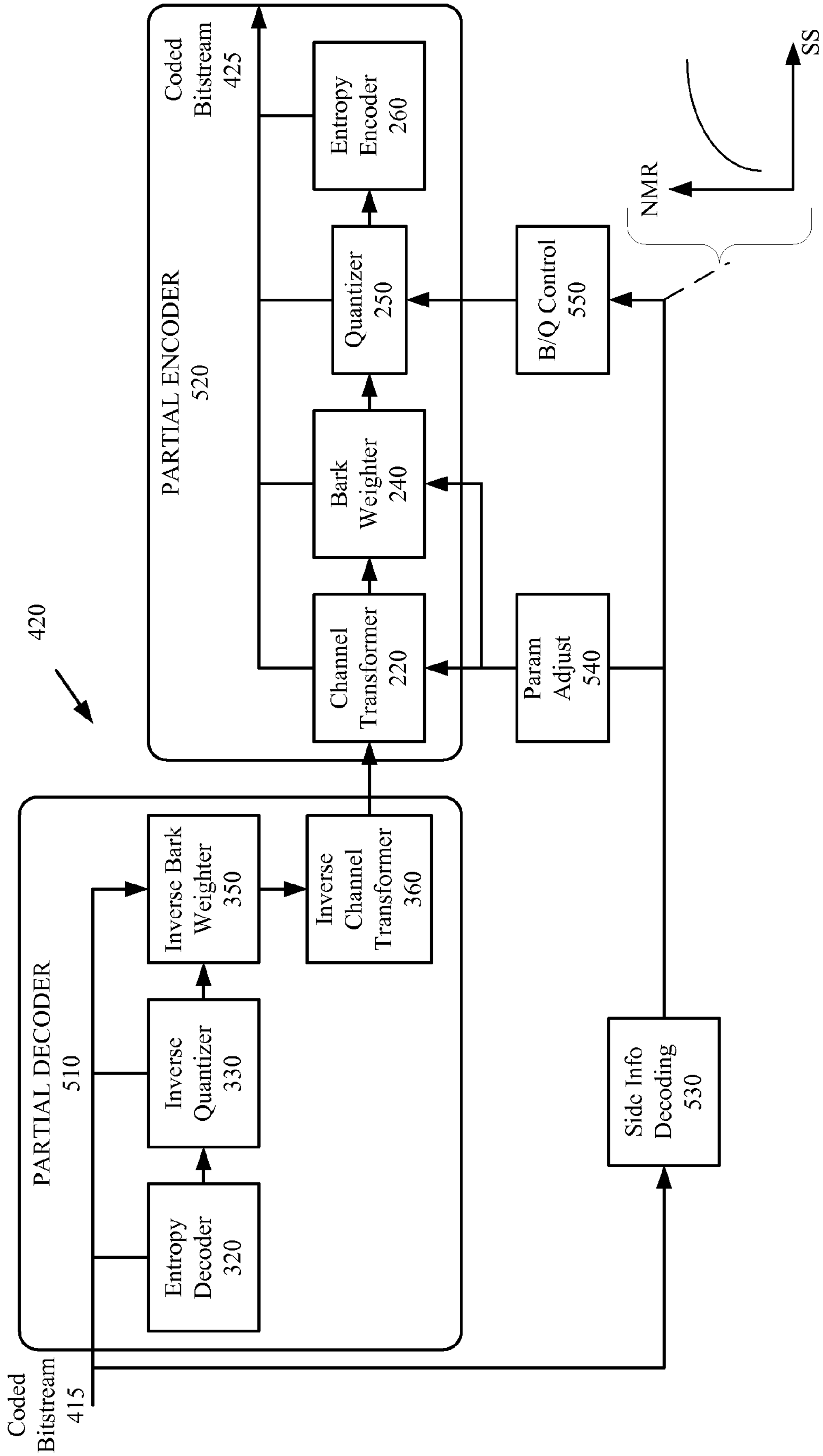
FIG. 5 is a block diagram illustrating an implementation of the bit-rate transcoder of FIG. 4.

FIG. 5 illustrates one example implementation of the bit-rate transcoder 420, which uses the encoder-generated side information transcoding technique to avoid having to fully decode and re-encode the bitstream. The bit-rate transcoder 420 includes a partial decoder 510 and partial encoder 520. The bitstream 415 that is encoded at the initial bit-rate and contains the encoder-generated side-information is input to the partial decoder 510.

The partial decoder performs various processing stages of the full audio decoder 300 (FIG. 3). For example, in this implementation, the partial decoder 510 includes the entropy decoder 320, inverse quantizer 330, inverse bark weighter 350, and inverse multi-channel transformer 360, which together decode the compressed audio content of the input bitstream 415 to frequency domain coefficients for the one or more channels of audio.

The bit-rate transcoder 420 also includes a side information decoder 530 that decodes the encoder-generated side information from the input bitstream 415. The side information consists of useful encoding parameters obtained from processing of the original input audio samples 205 (FIG. 2) at encoding. As such, these encoding parameters cannot be derived during transcoding because the original input audio samples are not available during transcoding. Through use of this side information, the bit-rate transcoder 420 is able to operate with nearly all the information available to the original audio encoder 200 from the original input audio sample 205 without the degradation from lossy compression. Consequently, the bit-rate transcoder can produce the bitstream for the target bit-rate with almost no quality degradation compared to a one-time encoding of the original audio samples into a bitstream with the target bit-rate.

This side information in the illustrated implementation includes multi-channel (e.g., stereo) processing parameters, and rate control parameters. The rate control parameters can be data characterizing a quality to quantization step size curve that is utilized for rate control by the rate/quality controller 270 with the quantizer 250. In one specific example, the quality to quantization step size curve can be a noise-to-mask ratio (NMR) versus quantization step size curve. This NMR curve is utilized by the rate/quality controller 270 of the audio encoder 200 to dynamically determine the quantizer step-size needed to achieve a desired bit-rate of the output bitstream 295. Techniques for utilizing the NMR curve for audio compression rate control is described in more detail by Chen et al., U.S. Pat. No. 7,027,982, entitled, "Quality And Rate Control Strategy For Digital Audio." The NMR curve can be easily modeled such that the curve can be fully characterized by simply encoding a few anchor points along the curve. The side information representing the NMR curve thus can be compactly encoded in the bitstream 415 using a relatively small proportion of the overall bit-rate.

In other implementations of the bit-rate transcoder 420, the side information also can include information used for other coding techniques at the encoder. For example, the side information can include encoding parameters used by the encoder for frequency extension coding techniques, such as described by Mehrotra et al., U.S. Patent Application Publication No. 20050165611, entitled, "Efficient Coding Of Digital Media Spectral Data Using Wide-Sense Perceptual Similarity."

The side information decoder 530 passes the decoded encoding parameters to a parameter adjuster 540. Based on these encoding parameters, the parameter adjuster 540 adjusts processing by the multi-channel transformer 220 and bark weighter 240 in the partial encoder 520. In the case of the multi-channel transformer 220, the adjustments can include parameters used in channel pre-processing or modifying the channel transform being used for the output bitstream 425. In the case of the bark weighter 240, the adjustments can include modifying the bark weights used by the bark weighter based on the encoding parameters.

The side information decoder 530 also passes the decoded NMR curve data to a bit-rate/quality controller 550 that controls quantization by the quantizer 250, so as to adjust encoding to the new target bit-rate. Because the encoding parameters that were passed as side information in the input bitstream are generated by the encoder 410 from the original input audio samples 405, the channel transformer 220, bark weighter 240, and bit-rate/quality controlled quantizer 250 are able to perform their respective encoding at the new target bit-rate while preserving nearly the same quality as a one-time encoding of a bitstream to the new target bit-rate from the original input audio samples 405.

Figure 1:
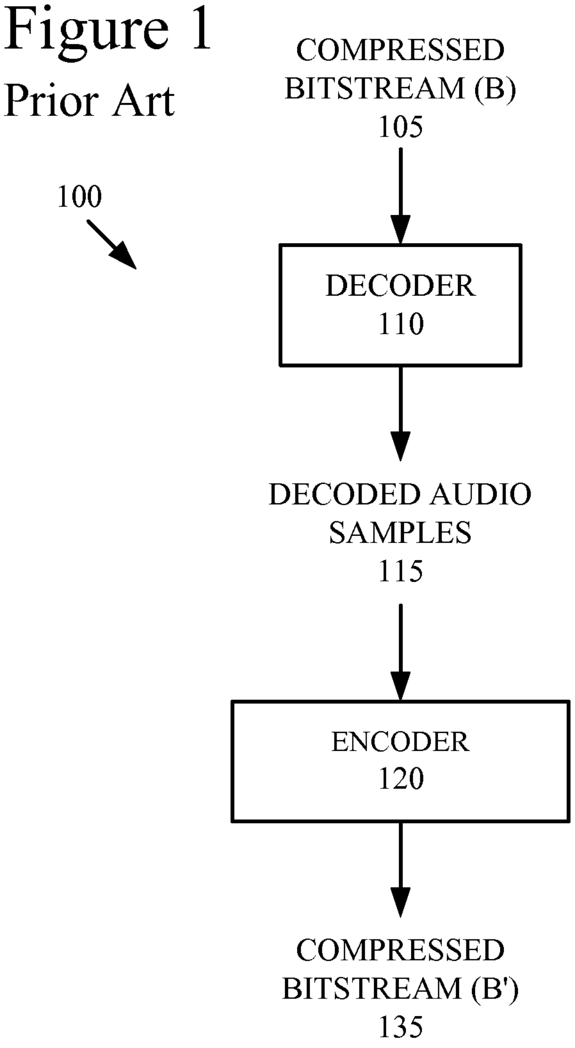
Figure 1 Prior Art
FIG. 1 is a block diagram illustrating a decode-and-encode type transcoder according to the prior art.

Further, because the bit-rate transcoder 420 is able to adjust the parameters for the multi-channel transformer and bark weighter stages based on the side information generated by the encoder 410 from the original input audio samples 405, the bit-rate transcoder is able to avoid having to fully reconstruct the audio samples before re-encoding to the new target bit-rate. In other words, the decoder portion of the bit-rate transcoder able to omit the inverse frequency transformer 370 of a full decoder, and the bit-rate transcoder's encoder portion omits the forward frequency transformer 210. The adjustment of the encoding parameters to the new target bit-rate is much less complex and takes much less computation than the inverse and forward frequency transform, which provides faster transcoding by the bit-rate transcoder 420 compared to the full decode-and-encode approach of the prior art transcoder 100 (FIG. 1).

Further, because the bit-rate transcoder 420 is able to adjust the parameters for the multi-channel transformer and bark weighter stages based on the side information generated by the encoder 410 from the original input audio samples 405, the bit-rate transcoder is able to avoid having to fully reconstruct the audio samples before re-encoding to the new target bit-rate. In other words, the decoder portion of the bit-rate transcoder is able to omit the inverse frequency transformer 370 of a full decoder, and the bit-rate transcoder's encoder portion omits the forward frequency transformer 210. The adjustment of the encoding parameters to the new target bit-rate is much less complex and takes much less computation than the inverse and forward frequency transform, which provides faster transcoding by the bit-rate transcoder 420 compared to the full decode-and-encode approach of the prior art transcoder 100 (FIG. 1).

Figure 6:
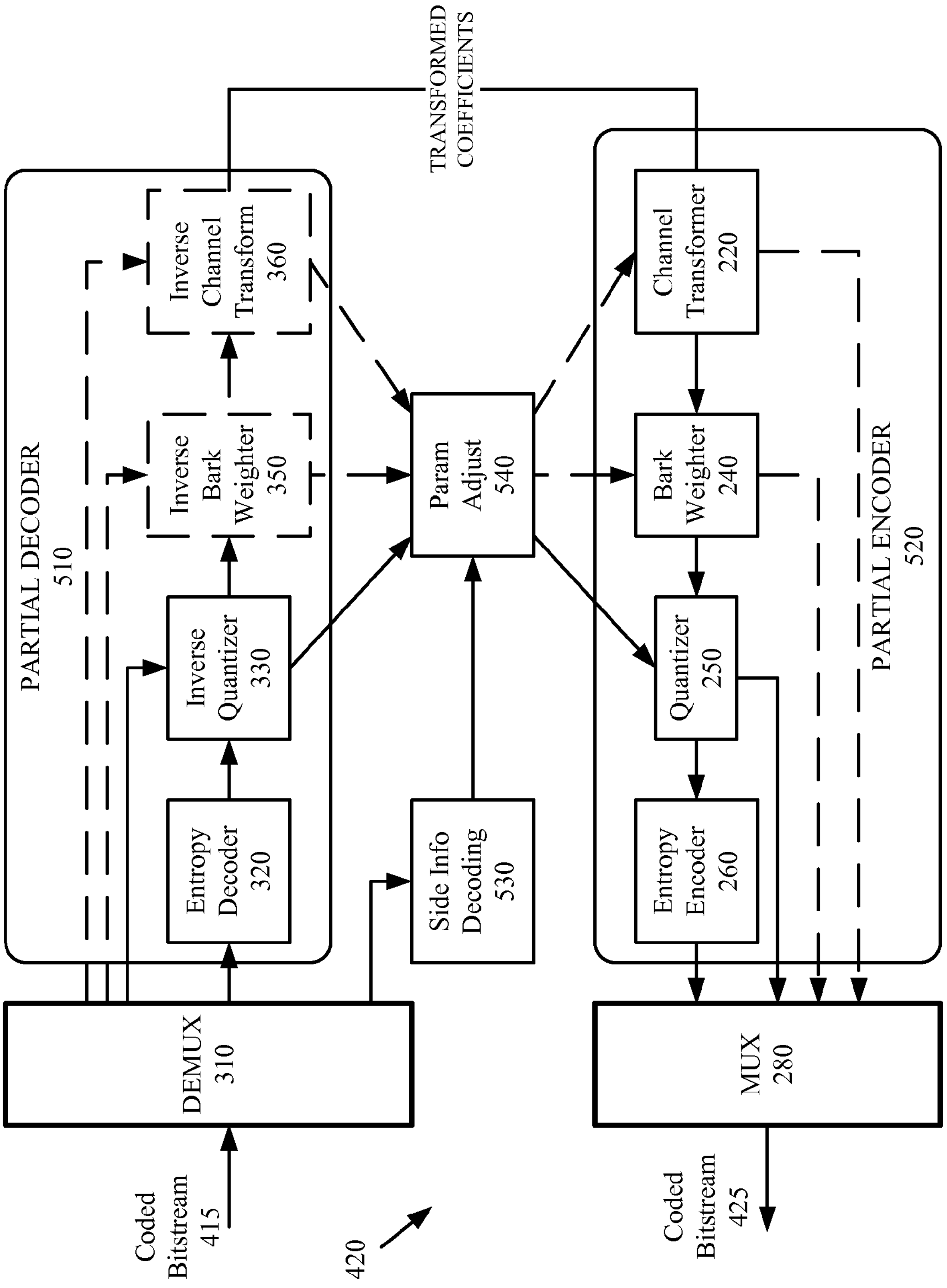
FIG. 6 is a block diagram illustrating alternative implementations of the bit-rate transcoder of FIG. 4.

FIG. 6 illustrates alternative implementations of the bit-rate transcoder 420. These alternative bit-rate transcoder implementations further reduce the complexity of transcoding (and increase transcoding speed) by taking the output at an intermediate stage in the partial decoder 510 and feeding it to the corresponding module of the partial encoder 520. For example, the bit-rate transcoder can take the partial decoder output directly after the inverse quantizer 330, and feed such output (with parameter adjustment) directly to the quantizer 250 in the partial encoder 520. This omits the computation of further decoding and encoding modules (i.e., inverse bark weighter 350, inverse channel transform 360, channel transformer 220, and bark weighter 240). However, such bit-rate transcoder implementations do not then make adjustments to the compressed bitstream for the target bit-rate at the channel transform or bark weighting stages. As a further example, another alternative implementation of the bit-rate transcoder can take the partial decoder output directly after the inverse bark weighter 350, and feed such output (with parameter adjustment) to the bark weighter 240 of the partial encoder 520. Compared to the implementation shown in FIG. 5, this would speed up transcoding by avoiding just the computational complexity of the inverse and forward channel transform, at the expense of not making adjustments in this processing stage. In a situation requiring even faster transcoding, if the coefficients are coded using an embedded bitstream, an alternative implementation of the bit-rate transcoder can optionally simply truncate the bitstream after entropy decoding, and thereby skip even the inverse and forward quantization.

FIGS. 5 and 6 show one possible order of decoding and encoding modules for the bit-rate transcoder 420. In further alternative bit-rate transcoder implementations, various other orders of the operations can be used. For example, the order of bark weighting and channel transform can be switched. In addition, the partial decoder and partial encoder can have a different mismatched order. For example, the partial decoder can do inverse bark weighting followed by the inverse channel transform, whereas the partial encoder can perform forward bark weighting followed by the forward channel transform. Similarly, the forward channel transform does not have to be the exact inverse of the inverse channel transform. For example, the partial decoder can use an inverse mid-side decoding, whereas the partial encoder can choose to use left-right coding.

III. Computing Environment

The bit-rate transcoder can be implemented in digital audio processing equipment of various forms, including specialized audio processing hardware which may be professional studio grade audio encoding equipment as well as end user audio devices (consumer audio equipment, and even portable digital media players). In a common implementation, the bit-rate transcoder can be implemented using a computer, such as a server, personal computer, laptop or the like. These various hardware implementations provide a generalized computing environment in which the transcoding technique described herein is performed.

Figure 7:
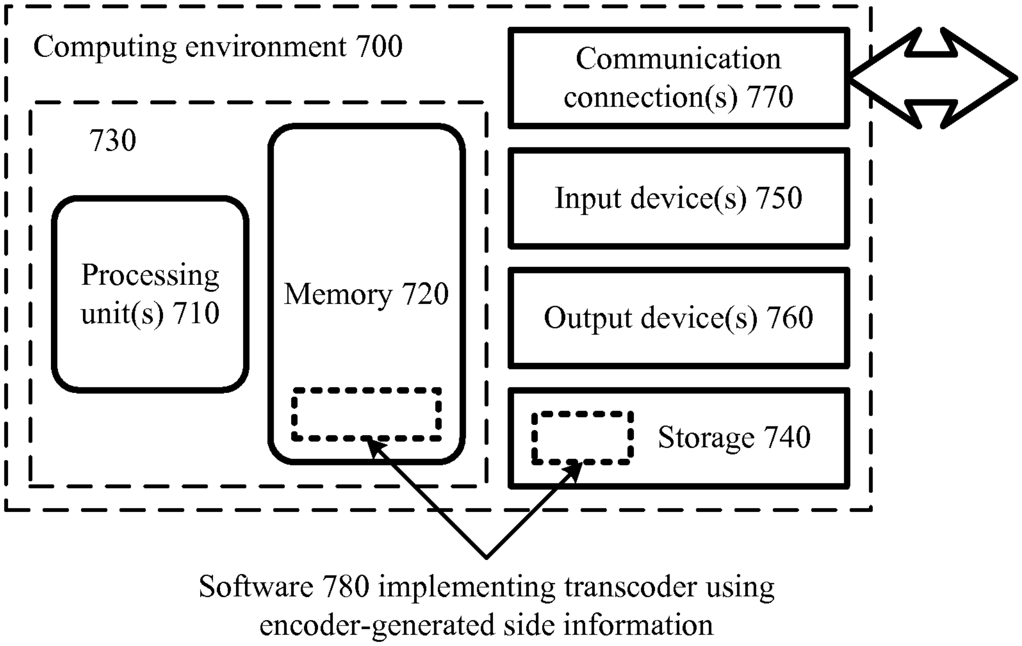
FIG. 7 is a block diagram of a generalized operating environment in conjunction with which various described embodiments may be implemented.

FIG. 7 illustrates a generalized example of a suitable computing environment 700 in which described embodiments may be implemented. The computing environment 700 is not intended to suggest any limitation as to scope of use or functionality, as described embodiments may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The processing unit also can comprise a central processing unit and co-processors, and/or dedicated or special purpose processing units (e.g., an audio processor). The memory 720 may be volatile memory (e.g., registers, cache, RAM), non-volatile memory (e.g., ROM, EEPROM, flash memory), or some combination of the two. The memory 720 stores software 780 implementing one or more audio processing techniques and/or systems according to one or more of the described embodiments.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for software executing in the computing environment 700 and coordinates activities of the components of the computing environment 700.

The storage 740 may be removable or non-removable, and includes magnetic disks, magnetic tapes or cassettes, CDs, DVDs, or any other medium which can be used to store information and which can be accessed within the computing environment 700. The storage 740 stores instructions for the software 780.

The input device(s) 750 may be a touch input device such as a keyboard, mouse, pen, touchscreen or trackball, a voice input device, a scanning device, or another device that provides input to the computing environment 700. For audio or video, the input device(s) 750 may be a microphone, sound card, video card, TV tuner card, or similar device that accepts audio or video input in analog or digital form, or a CD or DVD that reads audio or video samples into the computing environment. The output device(s) 760 may be a display, printer, speaker, CD/DVD-writer, network adapter, or another device that provides output from the computing environment 700.

The communication connection(s) 770 enable communication over a communication medium to one or more other computing entities. The communication medium conveys information such as computer-executable instructions, audio or video information, or other data in a data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments can be described in the general context of computer-readable media. Computer-readable media are any available media that can be accessed within a computing environment. By way of example, and not limitation, with the computing environment 700, computer-readable media include memory 720, storage 740, and combinations of any of the above.

Embodiments can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing environment.

For the sake of presentation, the detailed description uses terms like "determine," "receive," and "perform" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of transcoding an audio bitstream from an initially coded bit-rate to a target bit-rate using a computing system that implements an audio transcoder, the computing system including a processing unit and memory, the method comprising:

receiving the audio bitstream, the audio bitstream containing encoded data that represents audio content of an audio input signal, wherein the audio bitstream also contains encoding parameters generated by an audio encoder when encoding the audio input signal to produce the audio bitstream, wherein at least some of the encoding parameters are derived from the audio input signal, wherein the encoding parameters include rate control parameters that parameterize a quality to quantization step size curve, and wherein the rate control parameters comprise a plurality of anchor points on the quality to quantization step size curve;

with the computing system that implements the audio transcoder, decoding the encoding parameters from the audio bitstream;

with the computing system that implements the audio transcoder, partially decoding the audio content of the audio bitstream to an intermediate decoding stage prior to an inverse frequency transform; and with the computing system that implements the audio transcoder, re-encoding the partially-decoded audio content, based on the encoding parameters, to produce an output bitstream at the target bit-rate.

2. The method of claim 1 wherein said encoding parameters further comprise parameters for a multi-channel transform.

3. The method of claim 1 wherein said encoding parameters further comprise parameters for bark weighting.

4. The method of claim 1 wherein said encoding parameters further comprise parameters for frequency extension coding.

5. The method of claim 1 wherein the rate control parameters comprise data characterizing a noise mask ratio versus quantization step size curve.

6. The method of claim 1 wherein the decoding the encoding parameters comprises reconstructing the encoding parameters, the encoding parameters having been quantized to reduce the bit-rate of the encoding parameters.

7. The method of claim 1 wherein the output bitstream at the target bit-rate omits the encoding parameters.

8. A computing system that implements an audio transcoder, the computing system comprising:

a processing unit;

memory; and storage media storing computer-executable instructions for causing the computing system to implement the audio transcoder using:

an input for receiving an input audio bitstream encoded at an initial bit-rate by an audio encoder, the input audio bitstream containing encoded data that represents audio content of an audio input signal, the input audio bitstream also containing encoding parameters generated by the encoder when encoding the audio input signal to produce the input audio bitstream, wherein at least some of the encoding parameters are derived from the audio input signal, wherein the encoding parameters include rate control parameters that parameterize a quality to quantization step size curve, and wherein the rate control parameters comprise a plurality of anchor points on the quality to quantization step size curve;

a partial audio decoder having a plurality of decoding modules and operating to partially decode the encoded data to reconstruct the audio content to an intermediate decoding state;

a side information decoder for decoding the encoding parameters from the input audio bitstream; and a partial audio encoder having a plurality of encoding modules and operating to re-encode the audio content from the intermediate decoding state for a target bit-rate based on the encoding parameters to produce an output audio bitstream.

9. The computing system of claim 8 wherein said encoding parameters further comprise parameters for a multi-channel transform.

10. The computing system of claim 8 wherein said encoding parameters further comprise parameters for bark weighting.

11. The computing system of claim 8 wherein said audio content in said intermediate decoding state is in the form of frequency transform coefficients and said partial audio decoder omits an inverse frequency transformer of a full audio decoder.

12. The computing system of claim 8 wherein said partial audio decoder comprises an entropy decoder, an inverse quantizer, and a bark weighter.

13. The computing system of claim 8 wherein said partial audio decoder further comprises an inverse channel transformer.

14. The computing system of claim 8 wherein said partial audio decoder comprises an entropy decoder, and said intermediate state of said audio content is prior to inverse quantization.

15. The computing system of claim 8 wherein said encoding parameters further comprise parameters for frequency extension coding.

16. The computing system of claim 8 wherein the rate control parameters comprise data characterizing a noise mask ratio versus quantization step size curve.

17. The computing system of claim 8 wherein the decoding the encoding parameters comprises reconstructing the encoding parameters, the encoding parameters having been quantized to reduce the bit-rate of the encoding parameters.

18. The computing system of claim 8 wherein the output audio bitstream at the target bit-rate omits the encoding parameters.

19. A computer-readable storage media having computer executable instructions stored thereon for causing a computer to perform a method of transcoding an audio bitstream from an initially coded bit-rate to a target bit-rate, the method comprising:

receiving the audio bitstream, the audio bitstream containing encoded data that represents audio content of an audio input signal, wherein the audio bitstream also contains encoding parameters generated by an audio encoder when encoding the audio input signal to produce the audio bitstream, wherein at least some of the encoding parameters are derived from the audio input signal, and wherein the encoding parameters include rate control parameters that parameterize a quality to quantization step size curve;

decoding the encoding parameters from the audio bitstream, wherein the rate control parameters comprise a plurality of anchor points on the quality to quantization step size curve;

partially decoding the audio content of the audio bitstream to an intermediate decoding stage prior to an inverse frequency transform; and encoding the partially-decoded audio content based on the encoding parameters to produce an output bitstream at the target bit-rate, wherein the output bitstream omits the encoding parameters.

20. The computer-readable storage media of claim 19 wherein said encoding parameters further comprise parameters for a multi-channel transform.

21. The computer-readable storage media of claim 19 wherein said encoding parameters further comprise parameters for bark weighting.

22. The computer-readable storage media of claim 19 wherein said encoding parameters further comprise parameters for frequency extension coding.

23. The computer-readable storage media of claim 19 wherein the decoding the encoding parameters comprises reconstructing the encoding parameters, the encoding parameters having been quantized to reduce the bit-rate of the encoding parameters.

* * * * *